United States Patent
Klug et al.

(10) Patent No.: US 6,631,016 B1
(45) Date of Patent: Oct. 7, 2003

(54) FULL-PARALLAX HOLOGRAPHIC STEREOGRAMS ON CURVED SUBSTRATES

(75) Inventors: Michael A. Klug, Austin, TX (US); Mark E. Holzbach, Austin, TX (US)

(73) Assignee: Zebra Imaging, Inc., Pflugerville, TX (US)

( * ) Notice: Subject to any disclaimer, the term of this patent is extended or adjusted under 35 U.S.C. 154(b) by 0 days.

(21) Appl. No.: 09/908,828

(22) Filed: Jul. 18, 2001

(51) Int. Cl.⁷ .................................................. G03H 1/26
(52) U.S. Cl. .............................. 359/23; 359/22; 359/32; 359/8
(58) Field of Search .............................. 359/32, 23, 22, 359/474, 462, 463, 20, 21, 10, 11, 8

(56) References Cited

U.S. PATENT DOCUMENTS

| | | | |
|---|---|---|---|
| 4,364,627 A | | 12/1982 | Haines |
| 4,778,262 A | | 10/1988 | Haines |
| 4,830,445 A | * | 5/1989 | Robinson ..................... 353/88 |
| 4,834,476 A | | 5/1989 | Benton |
| 4,969,700 A | | 11/1990 | Haines |
| 5,044,708 A | | 9/1991 | Garcon |
| 5,138,471 A | | 8/1992 | McGrew |
| 5,216,528 A | | 6/1993 | Honda et al. |
| 5,237,433 A | | 8/1993 | Haines et al. |
| 5,589,957 A | | 12/1996 | Aritake et al. |
| 6,088,140 A | * | 7/2000 | Klug et al. ..................... 359/22 |
| 6,268,942 B1 | | 7/2001 | Ferdman et al. |

FOREIGN PATENT DOCUMENTS

| | | | | |
|---|---|---|---|---|
| GB | 2270772 A | * | 3/1994 | ................... 359/23 |
| WO | WO 0029909 | * | 5/2000 | ................... 359/23 |

OTHER PUBLICATIONS

Mark Holzbach, "Three-Dimensional Image Processing for Synthetic Holographic Stereograms," submitted to the Department of Architecture at the Massachusetts Institute of Technology, Sep., 1986, pp. 1–55.

* cited by examiner

*Primary Examiner*—John Juba
*Assistant Examiner*—Fayez Assaf
(74) *Attorney, Agent, or Firm*—Campbell Stephenson Ascolese LLP; Marc R. Ascolese

(57) ABSTRACT

The current invention comprises the recording of full parallax, one-step, full color holographic stereograms so as to properly display the resultant imagery when the hologram is mounted on a curved substrate after recording. It also comprises mounting the hologram on a substrate that can be curved in one or two dimensions, thereby producing any arbitrary shape. The hologram is scalable, making it possible to create curved holograms of unlimited size. The hologram can be generated for application to one of a variety of curved substrates, including hemi-cylindrical substrates with opaque backing to allow up to 180 degrees of horizontal view zone, and full cylinders with transparent backing to allow viewing through 360 degrees horizontally. It also includes adaptation to conical, spherical, and other curved geometric and irregular topographies.

25 Claims, 5 Drawing Sheets

FULL-PARALLAX HOLOGRAPHIC STEREOGRAMS ON CURVED SUBSTRATES

FIELD OF THE INVENTION

Background of the Invention

One-step hologram (including holographic stereogram) production technology has been used to satisfactorily record holograms in holographic recording materials without the traditional step of creating preliminary holograms. Both computer image holograms and non-computer image holograms may be produced by such one-step technology. In some one-step systems, computer processed images of objects or computer models of objects allow the respective system to build a hologram from a number of contiguous, small, elemental pieces known as elemental holograms or hogels. To record each hogel on holographic recording material, an object beam is passed through the rendered image (e.g., as displayed on a spatial light modulator (SLM)) and used with a reference beam to create an interference pattern on the holographic recording material. Examples of techniques for one-step hologram production can be found in the U.S. Patent Application entitled "Method and Apparatus for Recording One-Step, Full-Color, Full-Parallax, Holographic Stereograms," Ser. No. 09/098,581 (hereafter "the '581 application"), naming Michael A. Klug, Mark E. Holzbach, and Alejandro J. Ferdman as inventors, and filed on Jun. 17, 1998, which is hereby incorporated by reference herein in its entirety.

There is great interest in holograms with very wide viewing angles of 180°–360°. In many cases, "wrapping" the hologram image on a curved substrate during the hologram recording produces images with a broad angle of view when the images are mounted on the curved substrate. Such holograms enable viewing by a much larger audience than standard flat-format holograms. Additionally, curved format holograms can potentially improve the illusion of a suspended image, since the image is no longer anchored to a planar surface. In some cases, the image can be made to appear at the radial center of the mounting substrate, either as a virtual (behind the hologram plane) or aerial (in front of the hologram plane) image.

The difficulty in mounting, recording and illuminating curved-format holograms, however, has limited the usefulness and practice of this technique. It is particularly difficult to record holograms on substrates curved in two dimensions, since such holograms require the holographic recording material (e.g., photopolymerizable compositions, dichromated gelatin, and silver halide emulsions) to be directly coated onto such a substrate. Cylindrically-curved substrates are generally easier to accommodate, since they are curved in only one dimension and can be flattened temporarily, thereby simplifying recording and film processing.

There is wide and varied prior art for cylindrical-format holograms, beginning with the "Multiplex" hologram developed by Lloyd Cross in the early 1970's, proceeding most recently to Benton's "Alcove" hologram of t he late 1980's. U.S. Pat. No. 4,4834,476, entitled "Real Image Holographic Stereograms," and naming Stephen A. Benton as inventor, which is hereby incorporated by reference herein in its entirety, discloses a hemi-cylindrical format holographic stereogram (the "alcove hologram") comprised of 900 slit holograms that are 1 millimeter wide by 300 millimeters high. An example of a reflection alcove hologram 100 is shown in FIG. 1A. The image volume can occupy any portion of the solid angle subtended by the intersection of the viewer's eyes and the hemi-cylinder 102. The image(s) 104 incorporated in the reflection alcove hologram 100 are typically computer-generated and processed graphics, and the hologram itself can be reconstructed with a standard white light source 106 placed above and centered relative to the hemi-cylinder 102.

Although the reflection alcove hologram can produce imagery with a wide (up to 180°) viewing angle, a number of limitations are notable. Referring to FIGS. 1B and 1C, which show side and top views, respectively, of reflection alcove hologram 100, the reference illumination angle from light source 108 for the reflection alcove hologram 100 is fixed by the recording geometry, e.g., the angle of incidence of the reference beam with respect to the holographic recording material. Reflection alcove hologram 100 is horizontal parallax-only, and each of the component strip holograms has a horizontal viewing angle of about 53°, as shown in FIG. 1C. So, for example, a projected image about 275 mm across can be seen over an angle of approximately 90°–100° before cut off of the edges of the image is noticeable. Reflection alcove hologram 100 displays parallax in only the horizontal direction, and there is no apparent change in the position of an object with variations in the vertical viewpoint. Moreover, the same vertical image information is distributed across the entire 30° viewing angle (e.g., vertical viewing zones) for each of the hologram points 110, 120, and 130. Thus, viewability and image information are severely limited by the recording geometry and techniques.

The reflection alcove display is also particularly sensitive to defects in the mounting substrate. The lack of vertical parallax between the image and the hologram surface places the image vertical focus at the hologram surface, and this impression is heightened by any cosmetic defects in the hologram or its substrate.

Additionally, Benton describes the possibility of producing multi-color imagery in the reflection alcove as a process requiring exposure in a single wavelength with tedious multiple emulsion swelling steps between, and carefully calibrated image processing for each step. This is due primarily to the existence of optical elements in the recording system that only function properly with the monochromatic laser light, including holographic optical elements (HOEs) and non-achromatic refractive optics.

The use of specialized HOEs and cylindrical optics also make it difficult to scale the reflection alcove hologram, since doing so would likely involve incorporating optics with at least one dimension measuring the same size as the hologram itself. Thus, cylinder heights much larger than 300 millimeters would be very difficult to demonstrate in a nearly seamless fashion. Finally, the horizontal parallax-only characteristic of the reflection alcove necessitates a significant amount of astigmatism in the imaging system, thus limiting the maximum depth tolerable for comfortable viewing.

Given these, and other limitations of the prior art, it is therefore desirable to provide wide field of view, full-parallax, full-color holograms that are adaptable to substrates that are curved in one, two, or three dimensions, including cylindrical, conical, and spherical surfaces. It is also desirable to provide holograms on curved substrates that are scalable to unlimited size.

SUMMARY OF THE INVENTION

The current invention comprises the recording of full parallax, one-step, full color holographic stereograms that can be mounted on a curved substrate after recording. It also comprises mounting the hologram on a substrate that is curved in on a substrate that can be curved in one or two dimensions, thereby producing any arbitrary shape. The hologram is comprised of one or more tiles, and thus curved holograms of unlimited size can be generated. The hologram is adaptable to a variety of curved substrates including hemi-cylindrical substrates with opaque backing to allow up to 180° of horizontal view zone, and full cylinders with transparent backing to allow viewing through 360° horizontally.

In one embodiment, the present invention is a system for generating a holographic display on a curved substrate. The holographic display includes an image recorded on one or more tiles, and each tile is comprised of one or more holographic elements (hogels). The one or more tiles are mounted on the curved substrate. An image generation module is operable to allow a designer to specify a reference beam angle for each hogel and at least one of a radius of curvature for the substrate, a hogel orientation with respect to an image volume, a hogel orientation with respect to the substrate, and a hogel image orientation.

In another embodiment, the present invention includes a holographic display on a curved substrate comprised of a plurality of hogels recorded on the tile. The tile is mounted on the curved substrate. A plurality of hogels are recorded on the tile by varying at least one of a hogel orientation with respect to an image volume, a hogel orientation with respect to the substrate, and a hogel image orientation.

In another embodiment, a method for generating a holographic display on a curved substrate is provided that includes specifying a radius of curvature for the substrate;

specifying an angle of illumination for each of a plurality of hogels; and determining for each of the plurality of hogels at least one of a hogel orientation with respect to an image volume, a hogel orientation with respect to the substrate, and a hogel image orientation based on the curvature of the substrate and the angle of illumination for the respective hogel.

In each of the embodiments, the shape of the substrate can be hemi-cylindrical, cylindrical, conical, or spherical. Other, irregularly shaped surfaces can also be used. In the case of hemi-cylindrical or cylindrical surface, another cylindrical section having a radius larger than the substrate can be positioned around the substrate to provide a background for the holographic display.

The present invention has several advantages over alternative technologies. First, the present invention achieves curved, full parallax holographic displays that provide more depth cues than displays currently available in the prior art. The present invention also provides holographic displays that can be viewed from a variety of viewpoints including over and under the imaged object, while removing depth limiting and potentially distorting astigmatism. The present invention can also produce full-color imagery without the need for tedious and difficult emulsion swelling, and triple exposures. The displays are inherently scalable using tiling techniques disclosed in the '581 application in a manner similar to that for tiled flat format holograms. The ability in the current recording system to redirect the reference beam for each hogel makes it possible to tailor the illumination angle and distance independently of the print or substrate geometry. The current invention further enables the hologram to be mounted on any curved surface, instead of being dictated by fixed printer parameters, as in the alcove case. Finally, each hogel in the current invention has over twice the viewing angle as the alcove case, enabling much larger images to be produced, and enabling visibility of the image over a much broader angle.

Those having ordinary skill in the art will readily recognize that the systems and techniques described above and in the claims can be implemented using a variety of different computer graphics rendering methods. In particular, scan-line rendering, light-field models, and ray tracing are all examples of computer graphics techniques that can be uses to implement the present invention. Moreover, both software-based and hardware-based rendering systems (or some combination of the two) can be used to implement the present invention.

The foregoing has outlined rather broadly the objects, features, and technical advantages of the present invention so that the detailed description of the invention that follows can be better understood.

BRIEF DESCRIPTION OF THE DRAWINGS

The present invention can be better understood, and its numerous objects, features, and advantages made apparent to those skilled in the art by referencing the accompanying drawings. The use of the same reference symbols in different drawings indicates similar or identical items.

DETAILED DESCRIPTION

The aforementioned '581 application discloses a mechanical-optical recording system and software capable of sequentially exposing multiple hologram elements ("hogels") in, for example, a boustrophedontic fashion so as to produce a hogel array. These arrays can reconstruct volumetric images with full parallax, and in full color. Large images can be composed of two or more hogel arrays that fit on one or more tiles. When more than one tile is used, each tile includes a portion of the overall image, providing a highly scalable system.

Figure 1A:
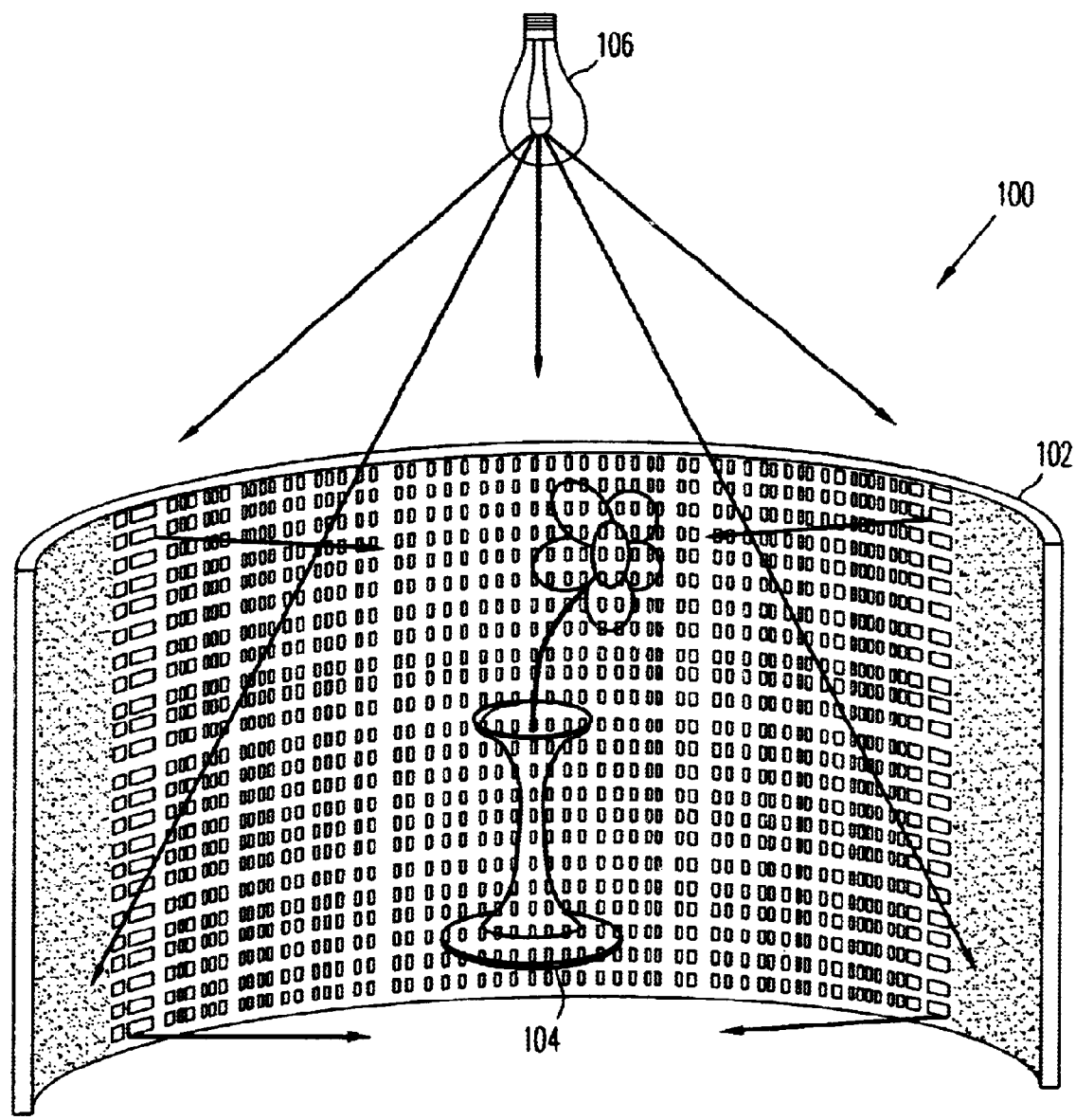
FIG. 1A is a front perspective view of an example of a reflection alcove hologram display.
Figure 1B:
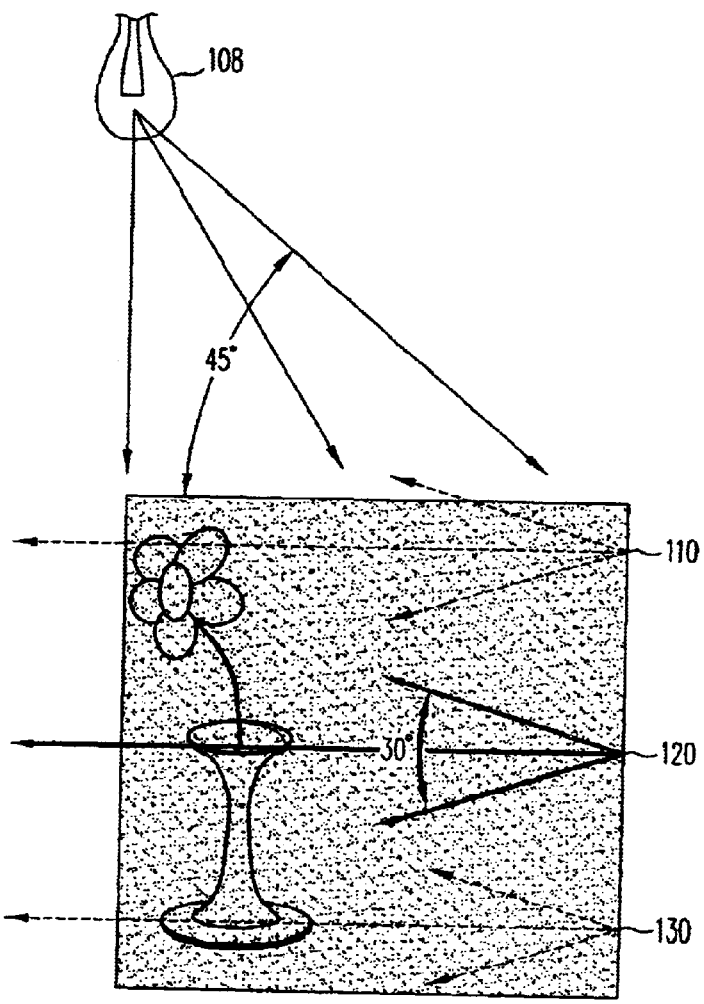
FIG. 1B is a side view of a portion of a reflection alcove hologram display having a fixed illumination angle.
Figure 1C:
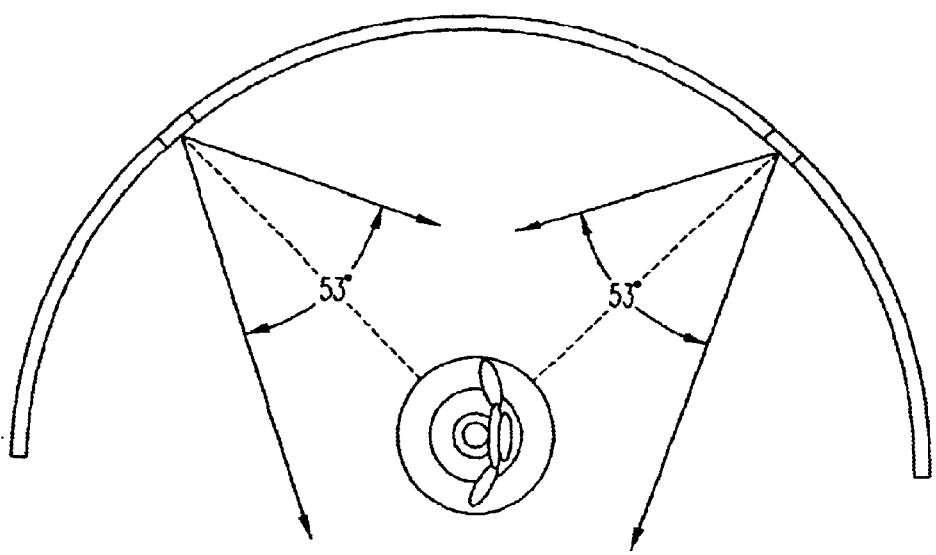
FIG. 1C is a top view of a portion of a reflection alcove hologram display having a fixed illumination angle.
Figure 2:
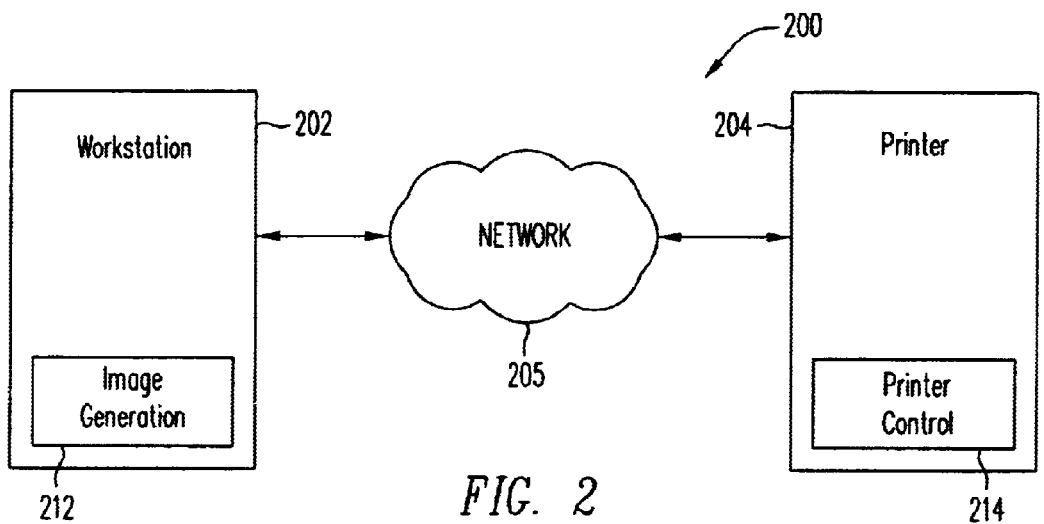
FIG. 2 is a block diagram of components in a system for generating a holographic display on a curved substrate.

Referring now to FIG. 2, a system 200 for producing holograms is shown including computer workstation 202 coupled to hologram printer 204 through network 206. In general, workstation 202 may be one or more computers (e.g., high performance graphics workstations, servers, specialized computer graphics rendering computers, or typical personal computers) used alone, or in some combination to produce graphics images and printer control information used by printer 204 to produce holograms. Examples of workstation 202 and hologram printer 204 are described in the aforementioned '581 application. Workstation 202 includes image generation module 212 for creating, importing, and manipulating images, as well as specifying hologram design parameters, that are used to produce the images for holograms created by printer 204. In general, image generation module 212 includes capabilities for generating graphics images as well as importing images from other sources (e.g., other graphics software or files, and peripherals such as cameras and storage devices).

In addition to the more traditional computer-graphics related functionality present in image generation module 212, the module typically includes software used for hologram layout and manufacturing. For example, a tile can be used as the basic unit for the hologram printing process. The size of a tile that can be processed by printer 214 is generally limited by the size of the holographic recording material available. Finished holograms can include one or more tiles with virtually any tile arrangement. Consequently image generation module 212 typically includes facilities for specifying one or more of the size, shape, orientation, and layout of the tile(s) used for the finished holographic display.

Each tile is composed of many holographic elements (hogels), typically arranged in a two-dimensional array on the surface of the tile, but which can, in general, be arranged in any format. Each hogel is independently "recorded" by printer 204 as a hologram, i.e., an object beam passing through an SLM that includes a graphic image to be recorded is made to interfere with a reference beam. The interference pattern created is recorded in the holographic recording material. To support this operation, image generation module 212 also includes facilities for specifying one or more of the size, shape, orientation, and layout of the hogels in a particularly tile. Additionally, one of the most important hogel features specified and/or determined in image generation module 212 is the reference beam angle for each hogel. For optimum display or "replay" of the recorded hogel, it is desirable to match as closely as possible the angle of incidence of the display light source with the angle of incidence used for the reference beam in the recording process, or vice versa. Image generation module 212 allows that angle to be specified in a variety of different ways. For example, the reference beam angle can be specified for each hogel independently. Alternately, a light source location for a given tile can be specified, and image generation module 212 then calculates the reference beam angle of incidence for each hogel based on one or more of the light source position, hogel location, image orientation, tile shape, and tile position.

Printer 204 is capable of generating full parallax, one-step, full color holographic stereograms as disclosed in the aforementioned '581 application using information received from image generation module 212. As noted above, one embodiment of image generation module 212 allows a designer to specify image design parameters for each hogel in the array of hogels making up a tile. A designer can also specify parameters for each tile. Image generation module 212 uses the design parameters to determine individual light intensities and directions for each hogel, based in part on the computer graphics image that forms the basis of the hologram to be recorded. This computation is independent of the orientation of each hogel so that the resultant imagery is properly displayed when the hologram is mounted on a curved substrate after recording. Thus image generation module 212 allows substrates to be curved in any dimension, thus having arbitrary, non-planar shapes. Printer control module 214 receives instructions from image generation module 212, and uses those instructions to control various aspects of printer 204 such as holographic recording material translation stages, SLMs, object and or reference beam steering devices, shutters, and other printer components as discussed in the '581 application.

For example, one embodiment of image generation module 212 recognizes a list of commands, and uses a graphical user interface (GUI) that can include toolbars, menus, and other user interface features for creating and visualizing images. Image generation module 212 includes components that allow a user to select, rotate, translate, scale, center, and interactively control the camera viewpoint through fly, zoom, and orbit modes. The user can change the appearance of images using, for example, fill mode, visibility, texture maps, and material property (e.g., transparency, reflectivity, and color) features.

Image generation module 212 also typically includes a camera editor that can be used in a design mode or a hologram printing mode. In the design mode, the camera represents a standard computer graphics pinhole camera. The user can specify camera parameters such as type of view (e.g., birds eye, front, side), camera position, direction, positive or "up" direction, field of view, and the distance of near/far clip planes relative to a chosen coordinate system. More than one camera can,be created in the design mode. When a new camera is created, its parameters default to the settings of the camera currently being used. The default parameters can be edited to position the camera at a different type of view, position, etc.

In the printing mode, camera parameters can vary corresponding to the particular tile and hogel that is being printed. The tiles and the image from which the hologram is generated must all share the same coordinate system. In one embodiment, image generation module 212 allows the designer to specify the following parameters for the camera, tile, and hogel: tile width and height, tile field of view, reference angle for each hogel, camera view vectors {position, direction, up} for each hogel, position of reference illumination source point for tile, tile radius of curvature.

Figure 3:
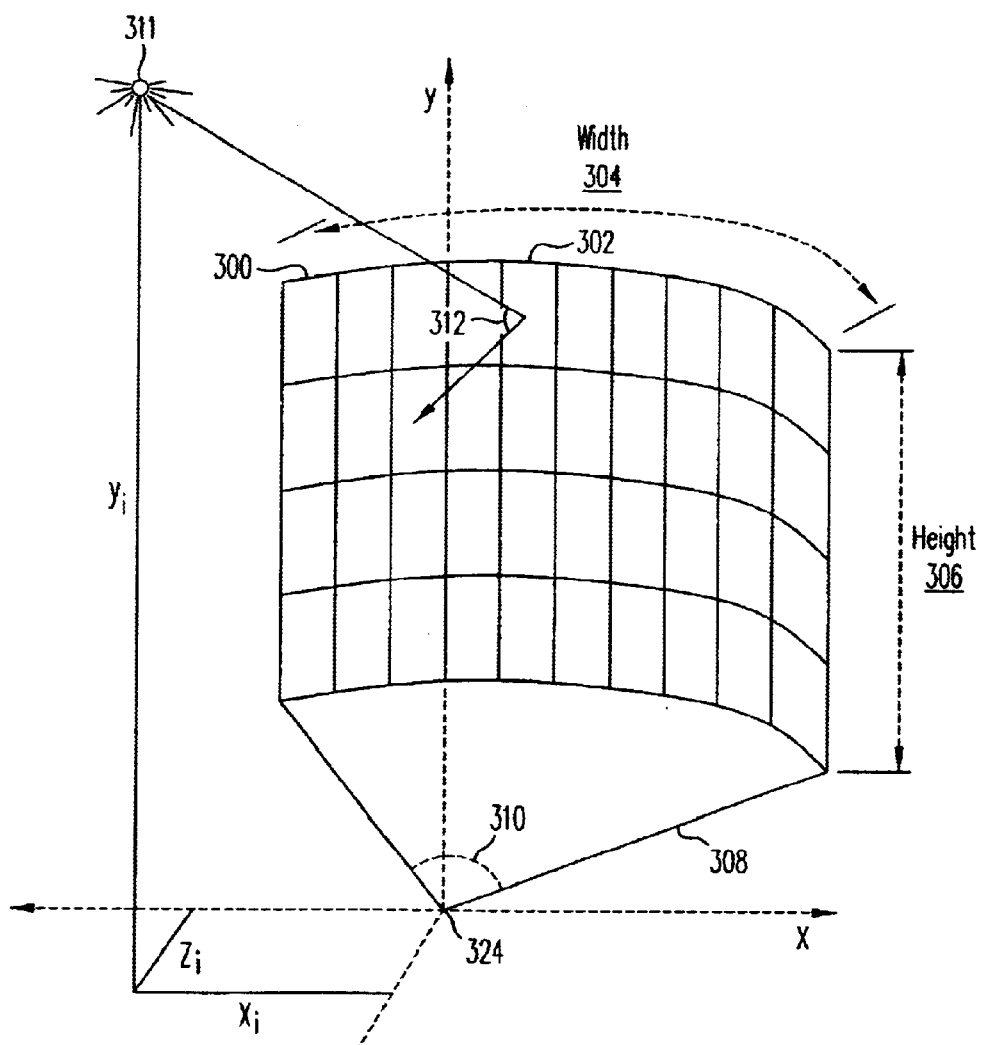
FIG. 3 is a perspective view showing parameters that can be specified for generating a tile with a plurality of hogels mounted on a curved substrate.

FIG. 3 shows some of these parameters in relation to tile 300 and hogels 302. Tile 300 is a simple example (i.e., the surface is curved along one dimension) of the sort of curved surface upon which holograms of the present invention can be applied. Additionally, while a typical tile might have tens of thousands (or more) of hogels, tile 300 is shown with a much smaller number of hogels for clarity. Tile 300 has tile width 304, tile height 306, radius of curvature 308. Angle 310 is spanned by tile 300. The angle of incidence for the illumination from light source 311 relative to the center of hogel 302 is shown as angle 312 (i.e. measured from the normal of hogel 302). In general, point light source 311 can be located in any desired location with respect to tile 300. Thus, a complete description of angle 312 may (in the most general example) include three separate angles, one for each of the three axes. The position of light source 311 ($x_i$, $y_i$, $z_i$) that will ultimately illuminate tile 300, and thus determines, along with hogel orientation, the angle of incidence for the reference beam used to record a hogel, is shown relative to origin 324.

Although the example of FIG. 3 shows a curved surface for tile 300, image generation module 212 can also parameterize the hogels to be recorded based on a planar tile. More specifically, image generation module 212 can operate on a model where the tile is assumed to be flat just like the actual tile upon which hogels are typically recorded), but where hogel parameters and the graphics images used to record each hogel are specified so that the final hologram is properly viewed on a substrate having the desired curvature.

Figure 4A:
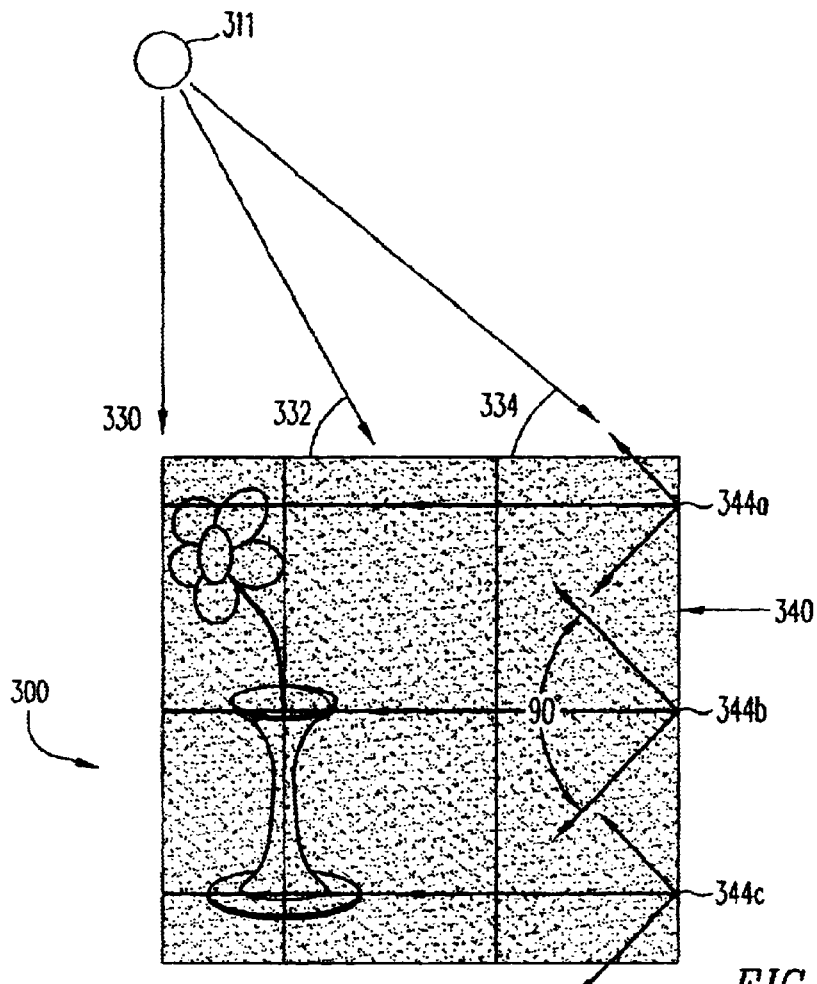
FIG. 4A is a side view of a portion of a hologram display having a variable illumination angle for each hogel in accordance with the present invention.

FIG. 4A shows a side view of a portion of a hologram display including tile 300. Three co-planar rays of light emanating from light source 311 are illustrated. The three rays each have an associated angle of incidence 330, 332, and 334 with respect to the normal of hogels along the back edge 340 of tile 300. In other words, the three rays illustrated, lie in a plane that is perpendicular to the plane of the hogels along back edge 340. Thus, it is desirable that hogels closer to the bottom of back edge 340 be created with reference beams whose angle of incidence is larger (e.g. like that of angle 332) compared to the angle of incidence for reference beams used for hogels closer to the top of back edge 340 (e.g., like that of angle 334). In this manner, optimum replay of the hologram is achieved because the hogels are recorded with reference beams whose angle of incidence more closely approximates that angle of incidence of light from light source 311.

Moreover, because the hogels of the present system can be created with both horizontal and vertical parallax, the image information varies across (by as much as 90° or more) the projection angles 344 in order to produce the parallax effect in the vertical.

Once the parameters for the curved format image have been specified, a computer graphic rendering system in printer control module 214 (FIG. 2) is configured. The curved-format hologram is recorded in much the same way, and using the same equipment, as holograms that are to be mounted on flat substrates, as described in the '581 application. The computer model of the hogel (e.g., hogel image) is defined as an element whose orientation changes with respect to the image volume, depending on its eventual orientation in the display. For a cylindrical hologram, for example, this implies a one-dimensional rotation (e.g. rotation about the vertical axis of the hogel) of the computer graphic hogel model as the holographic recording system progresses from column to column. Additionally, the coordinates for the illumination source position for the final curved format display is provided to the printer control module 214 to insure that the reference beam is properly redirected for each hogel to allow for distortionless image replay. Once these parameters are input into the image generation module 212, the procedure for recording the curved format hologram is identical to the standard procedure used for flat format holograms as described in the '581 application.

After hologram recording is complete, the holographic recording material is processed, and then applied to a curved substrate that conforms to the parameters that were specified for the image generation module 212. The hologram for each tile can be laminated to the substrate using adhesive films, attached to the substrate with vacuum suction, or other techniques capable of making the flexible film sheet firmly attach to the curved substrate. The hologram is then illuminated with a standard white light source from the position of reference illumination beam for tile that was specified for the image generation module 212 during recording. A distortion-free three-dimensional image with full parallax is produced.

Figure 4B:
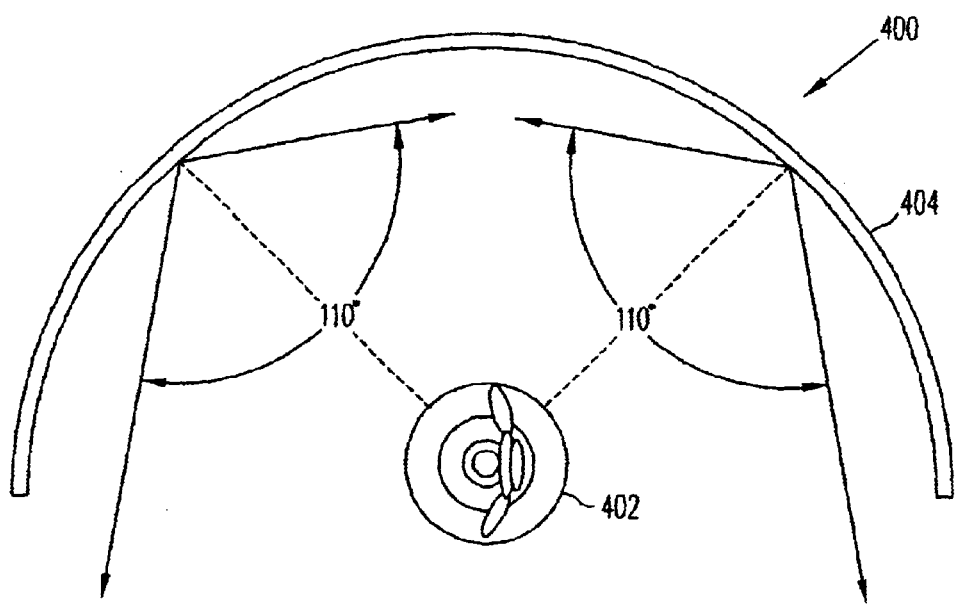
FIG. 4B is a top view of a hemi-cylindrical holographic display in accordance with the present invention.

A variety of curved formats can be implemented with the present invention. The curves can be constant radius, or the hologram can include two or more radii of curvature that vary across the three dimensional space of the mounting substrate. One interesting format is shown in FIG. 4B as a top view of concave hemi-cylinder hologram 400 that produces an aerial image 402 centered in the cylinder 404. With this configuration, the viewer advantageously has complete access to the image volume within the field of view of hologram 400. This allows the user to take measurements, and analyze the image from various viewpoints. As illustrated, each hogel individually has a 110° angle of view in the horizontal direction. Note that, as illustrated in FIG. 4A, the vertical angle of view is typically 90°. If the hologram was presented on a flat substrate, a viewer would be limited by the hogel's 110° angle of view in the horizontal direction. However, because of the curved substrate, the view angle is increase by virtue of the fact that the hogels have been wrapped around a point in space, i.e., the center of the cylinder. Thus, the reconstructed image appears at the center of the cylinder, and as long as a viewer can see into the hemi-cylinder, they can see the image, yielding a 180° view angle in the horizontal direction.

Figure 5B:
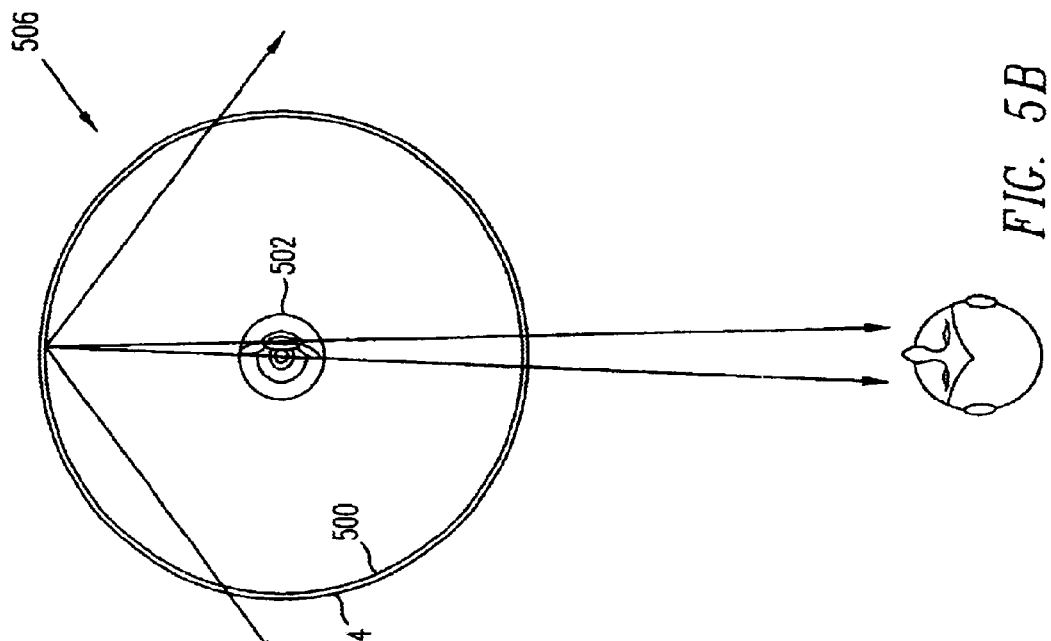
FIG. 5B is a top view of a cylindrical holographic display in accordance with the present invention.
Figure 5A:
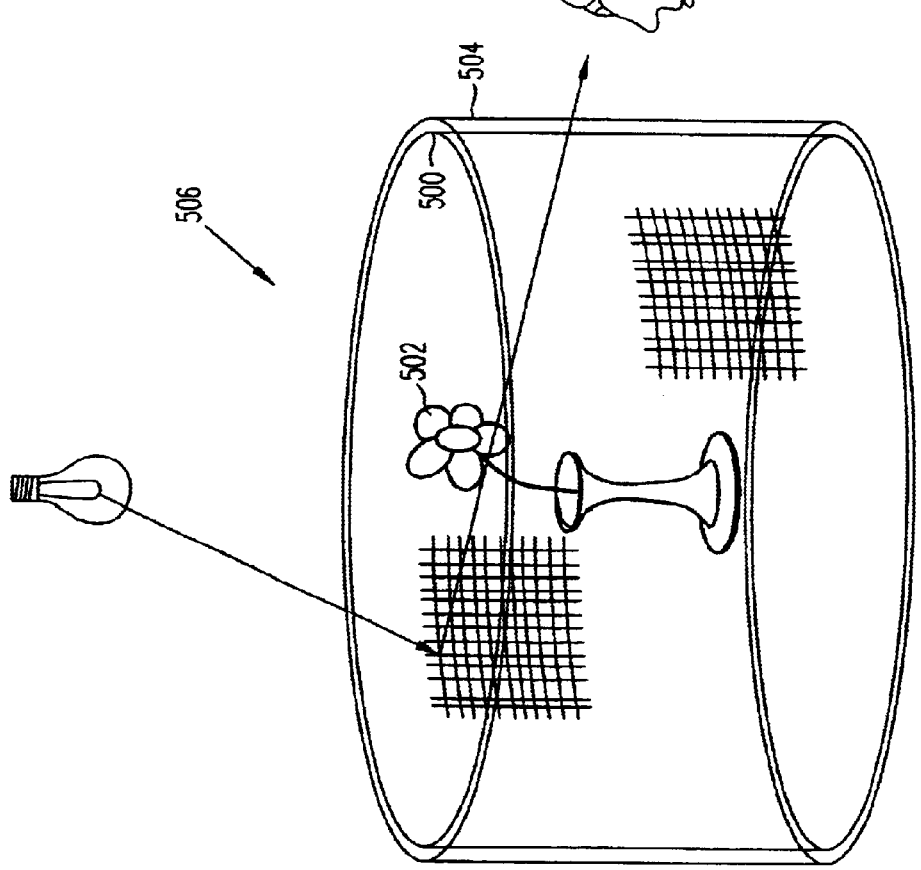
FIG. 5A is a side perspective view of a cylindrical holographic display in accordance with the present invention.

Another interesting format is a fully cylindrical substrate 500, as shown in FIGS. 5A and 5B, in which an aerial image 502 is also produced in the center. If the substrate 500 and the holographic recording material are substantially clear, the viewer can look through substrate 500 to view image 502 from 360°. A second cylindrical section 504 with a radius slightly larger than the hologram substrate 500 can surround substrate 500 in order to provide a dark background to improve image contrast, if necessary. Additionally, a polarizer oriented at 45° can be sandwiched between the hologram and the substrate. This would allow viewing through one side of the cylinder, i.e., light is allowed to pass through the polarizer from one side of the cylinder. That light would then be filtered out by the polarizer on the opposite side of the cylinder because it would be rotated 90° with respect to the polarizer on the first side. The outside cylinder section 504 can be rotatable by the viewer, so as to allow adjustment of its position as the viewer circles the hologram 506. The full-parallax nature of the invention, the fact that it is a reflection, and not a transmission hologram, and the wide vertical viewzone, enables the viewer to see the image even when their eye level is above or below the vertical extremes of the film. This is significant improvement over the alcove and multiplex holograms which display imagery that is visible only over a narrow vertical range.

The cylindrical embodiment of the present invention is a significant improvement over the reflection alcove for a number of other reasons as well. First, the full parallax nature of the present invention gives more depth cues and the ability to look over and under the imaged object, while removing depth limiting and potentially distorting astigmatism. The current invention can produce full color imagery without the need for tedious and difficult emulsion swelling, and triple exposures. This system is inherently scalable using tiling techniques disclosed in the '581 application in the same way that the flat format holograms produced with the same system are. The ability in the current recording system to redirect the reference beam for each hogel makes is possible to tailor the illumination angle and distance independently of the print or substrate geometry. The current invention enables the hologram to be mounted on any curved surface, instead of being dictated by fixed printer parameters, as in the alcove case. Finally, each hogel in the current invention has over twice the viewing angle as the alcove case, enabling much larger images to be visible in the curve bound volume, and enabling visibility of the image over a much broader angle.

While the invention has been described with respect to the embodiments and variations set forth above, these embodiments and variations are illustrative and the invention is not to be considered limited in scope to these embodiments and variations. For example, holograms can be generated in accordance with the present invention for substrates having one or more radii of curvature. This is because the overall display can be divided into a number of tiles, and a radius of curvature is specified for each tile. The shape of the substrate can be geometric or irregular. Accordingly, various other embodiments and modifications and improvements not described herein may be within the spirit and scope of the present invention, as defined by the following claims.

What is claimed is:

1. A system for generating a holographic display on a curved substrate, the holographic display including an image recorded on one or more tiles, each tile comprising one or more holographic elements (hogels), wherein the one or more tiles are mounted on the curved substrate, the system comprising:

an image generation module operable to allow a designer to specify a reference beam angle for each hogel and at least one of a radius of curvature for the substrate, a hogel orientation with respect to an image volume, and a hogel orientation with respect to the substrate.

2. The system of claim 1, wherein the image generation module allows the designer to specify the width and height of each tile.

3. The system of claim 1, wherein the image generation module calculates the reference beam angle for each hogel based on a light source position.

4. The system of claim 1, wherein the shape of the substrate is one of hemi-cylindrical, conical, and spherical.

5. The system of claim 1, wherein the shape of the substrate is cylindrical.

6. The system of claim 5, further comprising a second cylindrical section with a radius larger than the cylindrical substrate positioned around the substrate, wherein the second cylindrical section provides a background for the holographic display.

7. The system of claim 1, wherein the substrate includes two or more curves with different radii of curvature.

8. The system of claim 1 further comprising:

a printer system including a printer control module, wherein the printer control module controls the printer system to vary a reference beam angle of incidence of each hogel based on information from the image generation module.

9. A holographic display, comprising:

a curved substrate;

a tile mounted on the curved substrate; and a plurality of holographic elements (hogels) recorded on the tile by varying at least one of:

a hogel orientation with respect to an image volume; and a hogel orientation with respect to the substrate.

10. The holographic display of claim 9, wherein at least one of the a hogel orientation with respect to an image volume, the hogel orientation with respect to an image volume, and the hogel orientation with respect to the substrate is based on a curvature of the substrate.

11. The holographic display of claim 9, wherein at least one of the hogel orientation with respect to an image volume and the hogel orientation with respect to an image volume is based on an angle of illumination for the hogel.

12. The holographic display of claim 9, wherein the shape of the substrate is hemi-cylindrical, conical, or spherical.

13. The holographic display of claim 9, wherein the substrate is cylindrical.

14. The holographic display of claim 13, further comprising a second cylindrical section with a radius larger than the cylindrical substrate positioned around the substrate, wherein the second cylindrical section provides a background for the holographic display.

15. The holographic display of claim 9, wherein the substrate includes two or more curves with different radii of curvature.

16. A method for generating a holographic display on a curved substrate, the method comprising:

specifying a radius of curvature for the substrate;

specifying an angle of illumination for each of a plurality of recorded holographic elements (hogels); and determining for each of the plurality of hogels at least one of a hogel orientation with respect to an image volume, a hogel orientation with respect to the substrate, and a hogel image orientation based on the curvature of the substrate.

17. The method of claim 16, further comprising printing a tile comprising the hogels.

18. The method of claim 16, further comprising to specify the field of view of the tile.

19. The method of claim 16, further comprising specifying the width and height of the tile.

20. The method of claim 16, further comprising specifying camera view vectors for each hogel.

21. The method of claim 16, further comprising specifying a light source position for the tile.

22. The method of claim 16, wherein the shape of the substrate is hemi-cylindrical, conical, or spherical.

23. The method of claim 16, wherein the substrate is cylindrical.

24. The method of claim 23, further comprising positioning a second cylindrical section with a radius larger than the cylindrical substrate around the substrate to provide a background for the holographic display.

25. The method of claim 16, wherein the substrate includes two or more curves with different radii of curvature.

* * * * *